US009353286B2

(12) United States Patent
Cavalieri et al.

(10) Patent No.: US 9,353,286 B2
(45) Date of Patent: May 31, 2016

(54) POWDER COMPOSITIONS

(75) Inventors: Roberto Cavalieri, Padua (IT);
Alessandro Minesso, San Zenone Degli Ezzelini (IT); Luc Moens, Sint-Genesius-Rode (BE); Delfio Favrin, Vicenza (IT)

(73) Assignee: ALLNEX ITALY SRL, Romano d'Ezzelino (IT)

( * ) Notice: Subject to any disclaimer, the term of this patent is extended or adjusted under 35 U.S.C. 154(b) by 0 days.

(21) Appl. No.: 12/864,542

(22) PCT Filed: Jan. 30, 2009

(86) PCT No.: PCT/EP2009/051045
§ 371 (c)(1),
(2), (4) Date: Aug. 11, 2010

(87) PCT Pub. No.: WO2009/095460
PCT Pub. Date: Aug. 6, 2009

(65) Prior Publication Data
US 2010/0311896 A1 Dec. 9, 2010

(30) Foreign Application Priority Data
Jan. 31, 2008 (EP) .................................... 08101147

(51) Int. Cl.
C08L 67/00 (2006.01)
C09D 167/02 (2006.01)
C09D 167/06 (2006.01)
C08L 33/06 (2006.01)

(52) U.S. Cl.
CPC ............ C09D 167/02 (2013.01); C09D 167/06 (2013.01); *C08G 2150/20* (2013.01); *C08L 33/062* (2013.01)

(58) Field of Classification Search
USPC .................... 524/513; 525/176, 221
See application file for complete search history.

(56) References Cited

U.S. PATENT DOCUMENTS

| 4,007,144 | A | * | 2/1977 | Sanders et al. .................. 524/39 |
| 4,065,438 | A | | 12/1977 | Verborgt |
| 4,076,917 | A | | 2/1978 | Swift et al. |
| 4,286,021 | A | * | 8/1981 | Brendley, Jr. .................. 428/413 |
| 4,727,111 | A | | 2/1988 | Pettit, Jr. et al. |
| 4,788,255 | A | | 11/1988 | Pettit, Jr. et al. |
| 4,824,909 | A | | 4/1989 | Togo et al. |
| 4,957,814 | A | | 9/1990 | Barbee et al. |
| 5,153,252 | A | | 10/1992 | Skora |
| 5,397,641 | A | | 3/1995 | Moens et al. |
| 5,439,988 | A | * | 8/1995 | Moens et al. .................. 525/437 |
| 5,554,701 | A | * | 9/1996 | Chang et al. .................. 525/437 |
| 6,635,721 | B1 | * | 10/2003 | Moens et al. .................. 525/438 |
| 2001/0047062 | A1 | | 11/2001 | Zhou et al. |
| 2004/0014855 | A1 | | 1/2004 | Wenning |
| 2005/0171256 | A1 | * | 8/2005 | Belder .................. C09D 167/00 524/236 |
| 2005/0171300 | A1 | | 8/2005 | Moens et al. |
| 2006/0166001 | A1 | * | 7/2006 | Moens et al. .................. 428/413 |
| 2007/0225396 | A1 | | 9/2007 | Moens et al. |
| 2010/0016503 | A1 | | 1/2010 | Urmanova et al. |

FOREIGN PATENT DOCUMENTS

| DE | 24 11 465 | 2/1976 |
| DE | 40 12 020 | 2/1991 |
| EP | 0 322 834 | 10/1993 |
| EP | 0 473 380 | 9/1994 |
| EP | 0636669 A2 | 2/1995 |
| EP | 0980901 A2 | 2/2000 |
| EP | 1 067 159 | 1/2001 |
| EP | 0 649 890 | 8/2001 |
| EP | 1 726 621 | 11/2006 |
| EP | 2 085 440 | 8/2009 |
| JP | 52-94397 | 8/1977 |
| JP | S5647457 | 4/1981 |
| JP | 62-240369 | 10/1987 |
| JP | 01-98672 | 4/1989 |
| JP | 01-313573 | 12/1989 |
| JP | 04-504733 | 8/1992 |
| JP | H04 504733 | 8/1992 |
| JP | H05 509346 | 12/1993 |
| JP | 1995-018169 | 1/1995 |
| JP | 1996-311395 | 11/1996 |
| JP | 08-337644 | 12/1996 |
| JP | 09-151338 | 6/1997 |
| JP | 11-12537 | 1/1999 |
| JP | 11-152444 | 6/1999 |
| JP | 11-506156 | 6/1999 |
| JP | 11-228676 | 8/1999 |
| JP | 1999228676 A | 8/1999 |
| JP | 2001-200201 | 7/2001 |
| JP | 2003-504452 | 2/2003 |
| JP | 2003176447 | 6/2003 |
| JP | 2004-516357 | 6/2004 |

(Continued)

OTHER PUBLICATIONS

Bieleman (Additives for coatings, Wiley-VCH, (2000) p. 169).*
BLC701—Ningbo South Sea Chemical Co., Ltd.
BYK®-361 N for Powder—BYK:Additive Guide.
Published International Search Report for PCT/EP2009/051045; mailed Sep. 30, 2009.
Robert R. Engelhardt, "Carboxyl Functional Polyesters for Powder Coatings", Water-Bourne & Higher Solids, and Powder Coatings Symposium, New Orleans, LA, USA, Feb. 24-26, 1993, pp. 549-561.
Code of Federal Regulation, Food and Drugs, 21, Part 170 to 1999, Apr. 1, 2000, pp. 3, 158-163, 170 and 171.
Inventory of Effective Food Contact Substances (FCS) Notifications, FCN No. 256, EMS Chemie AG/EMS Primid, Oct. 19, 2002.
M. Soccio et al., "Poly(propylene isophthalate, Poly(propylene succinate), and Their Random Copolymers: Synthesis and Thermal Properties", Journal of Polymer Science Part II: Polymer Physics, vol. 45, 2007, pp. 310-321.

(Continued)

Primary Examiner — Wenwen Cai
(74) Attorney, Agent, or Firm — Wenderoth, Lind & Ponack L.L.P.

(57) ABSTRACT

A thermosetting and/or radiation curable powder with a binder prepared from a polyester (PE) obtained from a polyol with lower amounts of neopentyl glycol (NPG). The powder forms smooth defect free coats and is resistant to contamination from conventional NPU-rich PE.

10 Claims, No Drawings

(56) References Cited

FOREIGN PATENT DOCUMENTS

| | | |
|---|---|---|
| JP | 2007-177235 | 7/2007 |
| WO | 90/12827 | 11/1990 |
| WO | 91/01748 | 2/1991 |
| WO | 92/01756 | 2/1992 |
| WO | 9201756 A1 | 2/1992 |
| WO | 97/20895 | 6/1997 |
| WO | 97/30131 | 8/1997 |
| WO | 00/55268 | 6/2000 |
| WO | 02/50201 | 6/2002 |
| WO | 02/055620 | 7/2002 |
| WO | 03082996 A2 | 10/2003 |
| WO | 04/000958 | 12/2003 |
| WO | 2004/013240 | 2/2004 |
| WO | 2006/125545 | 11/2006 |
| WO | 2008000471 A2 | 1/2008 |

OTHER PUBLICATIONS

Carl J. Sullivan, "High Performance Polyester Coating Systems: Introduction of 2-Methyl-1,3-Propanediol", presented at XXII FATIPEC Congress, May 1994, 16 pages.

Daniel B. Pourreau et al., "Polyester Resins: Bang for the Buck", Modern Paint and Coatings, 1999, pp. 1-4.

English translation of Office Action issued Nov. 27, 2014 in Japanese Application No. 2010-544707.

English translation of Third Party Observations filed Sep. 29, 2014 in Japanese Applcation No. 2010-544707.

Opposition to EP 2247679 (Patentee Allnex Belgium, S.A.) by PPG Industries, Inc. (Opponent), filed Aug. 13, 2014.

International Search Report issued Jun. 5, 2009 in International (PCT) Application No. PCT/EP2009/051064.

\* cited by examiner

POWDER COMPOSITIONS

This application is the U.S. National Phase application of International Application No. PCT/EP2009/051045, filed Jan. 30, 2009 and published in English as WO 2009/095460, which claims benefit of priority from European Patent Application No. 08101147.0 filed Jan. 31, 2008, each of which is incorporated by reference herein in its entirety.

INTRODUCTION

The present invention relates to the field of powdered compositions (thermoset and radiation curable powders) which provide coatings which are substantially defect free.

Powdered compositions are widely used as paints and varnishes for coating many articles as they have numerous advantages. They are preferred to compositions using organic solvents which are difficult to handle and also there is little waste, since only the powder in direct contact with the article is retained on it, and any excess powder is, in principle, entirely recoverable and reusable. Powders generally contain an organic binder, fillers, pigments, catalysts and various additives to adapt their properties to their intended use.

There are various types of binders including those that contain a mixture of polyesters comprising one or more functional groups (such as carboxy functional polyesters) and one of more compound(s) having functional groups reactable with the polyester's functional groups (such as triglycidyl isocyanurate, and/or glycidyl functional acrylic copolymers).

Polyesters suitable for preparing powder varnishes and paints have already been described in numerous articles and patents. These polyesters are usually prepared from aromatic dicarboxylic acids, mainly terephthalic acid (TPA) and isophthalic acid (IPA) and optionally a minor proportion of aliphatic or cycloaliphatic dicarboxylic acids, and from various polyols such as ethylene glycol, neopentyl glycol (NPG), 1,6-hexanediol, and/or trimethylolpropane (TMP).

Generally the polyols used to prepare these polyesters contain a high proportion (typically >85% by weight) of NPG to improve the film forming ability of the resultant polyester and the powder composition containing it. This results in a coating without surface defects. NPG is expensive, so to prepare more affordable powder compositions which can also be free of surface defects it is desirable to prepare the polyester component by using lower amounts of NPG and greater proportion of cheaper polyhydric alcohols (such as for example ethylene glycol and diethylene glycol). When polyesters are formed from polyol mixtures containing an increased proportion of glycols such as ethylene glycol and diethylene glycol, the surface defects of the coating increase.

Nevertheless polyesters formed from polyols richer in ethylene glycol and diethylene glycol have been described in several publications.

PRIOR ART

JP 1999-228676 claims for a resin composition for powder coating with improved weathering and solvent resistance. The polyester is carboxy functional with an acid number (AN) of from 13 to 85 mg KOH/g and comprises a diacid component of 70 to 100% mole of IPA and from 0 to 30% mole of another dicarboxylic acid, and a glycol component of 70 to 100% mole of ethyleneglycol and from 0 to 30% mole of another aliphatic diol. The curing agent is a β-hydroxyalkylamide curing agent or triglycidyl isocyanurate.

U.S. Pat. No. 4,065,438 claims for a process for producing acid polyester resins which are used to manufacture coating products by reaction with an epoxy resin, said polyester being produced from the reaction of a prepolymer having a $OH_n$ between 40 and 200 mg KOH/g, said prepolymer being prepared from the reaction of at least one divalent aliphatic alcohol, more particularly ethylene glycol, used in an amount corresponding to 25 to 35% weight based on the total weight of the reaction mixture with TPA used in an amount of from 35 to 50% weight, trimellitic acid, used in an amount of 8 to 15% weight with IPA used in an amount of 5 to 30% weight thus resulting in a hydroxy functional prepolymer which upon reaction with IPA and optionally adipic acid is turned into a carboxylic acid functional polyester with an AN of from 50 to 100 mg KOH/g. The polyesters have a functionality between 2 and 3. The polyesters as illustrated (Example 1, 3, 4, 5 & 6) all are based on ethylene glycol as the only diol, TPA, IPA and trimellitic anhydride. The powders, obtained from a binder composed of the polyester and a Bisphenol A epoxy resin—the epoxy resin being present in an equal or preponderant amount relative to the polyester resin—give coatings which are characterized by their uniform aspect and by their hardening time which is particularly short.

WO 03/082996 attempts to reduce surface defects in a powder comprising a polyester obtained from an ethylene glycol rich polyhydric alcohol. A trialkyl amine or phosphine or a tetraalkyl ammonium or phosphonium halide is added to powder in an amount from 0.1 to 3% weight based on the amount of polyester in the composition. Although this additive is stated to remove the surface defects it also affects tribo-chargeability, curing speed and flow of the powder.

STATEMENT OF INVENTION

Previous attempts to solve the problem of providing coatings free of surface defects with powders containing polyesters formed from polyols with lower amounts of NPG are unsatisfactory as such powders are susceptible to contamination and/or have other problems such as use of undesirable additives. Therefore there is still a need to provide such a powder coating that is affordable for use in general applications which can provide a defect free surface and is resistant to contamination.

We now have surprisingly found that some or all of the problems described herein may be solved by the invention as described herein.

Therefore broadly in accordance with the present invention there is provided a powder composition that comprises, as a binder, a mixture of:
(A) a polyester (obtained from polyols comprising lower amounts of neopentyl glycol (NPG)) where the polyester comprises a first functionality,
(B) a small amount (preferably up to about 10% by weight of the binder) of an acrylic copolymer optionally comprising a second functionality; and
(C) an optional additional ingredient;
where;
(I) the first functionality is carboxy, the second functionality where present is selected from carboxy and/or glycidyl groups, and the additional ingredient comprises a cross-linker that has functional groups that can react with carboxy on the polyester; or
(II) the first functionality is hydroxy, the second functionality where present is selected from hydroxy and/or isocyanate groups; and the additional ingredient comprises a cross-linker that has functional groups that can react with the hydroxy on the polyester; or
(III) the first functionality, and second functionality where present, is an ethylenically unsaturated group and the additional ingredient where present comprises one or more oligomers having ethylenically unsaturated groups and the powder composition is curable by radiation.

Advantageously the polyester (A) is obtained from polyols comprising lower amounts of neopentyl glycol (NPG). Advantageously the polyester (A) is prepared from a polyol comprising up to 85% by weight of neopentyl glycol (NPG).

Advantageously the acrylic copolymer, optionally comprising a second functionality, is used in a small amount. Advantageously the acrylic copolymer is used in an amount up to 10% by weight of the binder. Generally less than 9%, advantageously less than 8%, preferably less than 7%, more preferably less than 6%, by weight, of acrylic copolymer is used. Advantageously at least 0.2%, preferably at least 0.3%, more preferably at least 0.5%, at least 1%, or possibly at least 1.5%, by weight, of acrylic copolymer is used.

Generally the acrylic copolymer is used in an amount from 0.2 to 5%, preferably from 0.3 to 5%, more preferably from 0.2 to 3.5%, most preferably from 0.3 to 3%, by weight (of the binder).

The acrylic copolymer advantageously is composed of (or is obtained from):
(A) from 30 to 100 mole % (preferably from 30 to 95 mole %) of methyl(meth)acrylate and/or ethyl(meth)acrylate and/or an ethylenically unsaturated monomer different from a (meth)acryloyl group containing monomer;
(B) from 0 to 60 mole % (preferabaly from 5 to 60 mole %) of one or more (cyclo)alkyl(meth)acrylate monomers characterized in that the (cyclo)alkyl group comprises from 3 to 20 carbon atoms, said (cyclo)alkyl group preferably selected from propyl, n-butyl, isobutyl, tert-butyl, n-hexyl, 2-ethylhexyl, lauryl, stearyl, tridecyl, cyclohexyl, isobornyl, or dihydrodicyclopentadienyl, and
(C) from 0 to 45 mole of a monomer having an ethylenically unsaturated double bond and a functional group selected from the carboxyl, glycidyl, hydroxy and/or isocyanate group.

Optionally, the methyl(meth)acrylate and/or ethyl(meth) acrylate is halogenated.

Preferably the acrylic copolymer monomers used comprise at least 60 mole % of said methyl(meth)acrylate and/or ethyl (meth)acrylate and/or said ethylenically unsaturated monomer different from a (meth)acryloyl group containing monomer.

In an embodiment of the invention the acrylic copolymer comprises said second functionality. Advantageously, however, the acrylic copolymer does not comprise said second functionality. Advantageously the acrylic copolymer comprises no functional groups that participate in the cross-linking reaction. Advantageously the acrylic copolymer comprises no groups selected from carboxyl, glycidyl, hydroxy and/or isocyanate groups.

Optionally a further or additional ingredient is admixed to the polyester (A) and the acrylic copolymer (B). By additional (or further) is advantageously meant that (C) is other than (B) and (A).

One embodiment of the present invention provides powder compositions that comprise, as a binder, a mixture of a carboxyl functional polyester (obtained from polyols comprising lower amounts of NPG), a small amount of an acrylic copolymer optionally comprising carboxyl and/or glycidyl group functional groups; and a cross-linker that has functional groups that can react with carboxylic acid groups on the polymer(s).

Preferably this first embodiment of the present invention provides thermosetting powder coating composition comprising as a co-reactable binder:

(a) from about 40% to about 98% by weight of at least one carboxyl-functional polyester with a glass transition temperature higher than 40° C., where the polyester has been obtained from the reaction of:
  (i) a polyacid component comprising from about 70 to about 100% by weight of the polyacid of terephthalic acid (TPA) and/or isophthalic acid (IPA) and from 0 to about 30% by weight of the polyacid of another polyacid constituent; and
  (ii) a polyol comprising from 0 to about 85% by weight of the polyol of neopentyl glycol (NPG) and from about 15 to about 100% by weight of the polyol of another polyhydric polyol;
(b) from about 0.2 to about 5% by weight of at least one acrylic copolymer having a number average molecular weight of from 1000 to 15000, the copolymer optionally comprising carboxy functional group(s) and/or glycidyl functional group(s);
(c) from about 2 to about 60% by weight of at least one glycidyl functional polyphenoxy resin and/or a polyepoxy and/or β-hydroxyalkylamide crosslinker;
where, unless stated otherwise, the above weight percentages are calculated with respect to the total weight of components (a) (b) and (c) and are selected to total 100%.

More preferably this first embodiment of the present invention provides thermosetting powder coating composition comprising as a co-reactable binder:
(a) from about 40% to about 96% by weight of at least one carboxyl-functional polyester with a glass transition temperature higher than 40° C., where the polyester has been obtained from the reaction of:
  (i) a polyacid component comprising from about 70 to about 100% by weight of the polyacid of terephthalic acid (TPA) and/or isophthalic acid (IPA) and from 0 to about 30% by weight of the polyacid of another polyacid constituent; and
  (ii) a polyol comprising from 0 to about 80% by weight of the polyol of neopentyl glycol (NPG) and from about 20 to about 100% by weight of the polyol of another polyhydric polyol;
(b) from about 0.3 to about 5% by weight of at least one acrylic copolymer having a number average molecular weight of from 1000 to 15000, the copolymer optionally comprising carboxy functional group(s) and/or glycidyl functional group(s);
(c) from about 3 to about 60% by weight of at least one glycidyl functional polyphenoxy resin and/or a polyepoxy and/or β-hydroxyalkylamide crosslinker;
where, unless stated otherwise, the above weight percentages are calculated with respect to the total weight of components (a) (b) and (c) and are selected to total 100%.

Another, second, embodiment of the present invention provides powder compositions that comprise, as a binder, a mixture of a hydroxy functional polyester (obtained from polyols comprising lower amounts of NPG), a small amount of an acrylic copolymer optionally comprising hydroxy and/or isocyanate group functional groups; and a cross-linker that has functional groups that can react with the hydroxy groups on the polymer(s).

Preferably this second embodiment of the present invention provides a thermosetting powder coating composition comprising as a co-reactable binder:
(a) from about 40% to about 96% by weight of at least one hydroxy-functional polyester, with a glass transition temperature higher than 40° C., where the polyester has been obtained from the reaction of:

(i) a polyacid component comprising from about 70 to about 100% by weight of the polyacid of terephthalic acid (TPA) and/or isophthalic acid (IPA) and from 0 to about 30% by weight of the polyacid of another polyacid constituent; and (ii) a polyol comprising from 0 to about 85% by weight of the polyol of neopentyl glycol (NPG) and from about 15 to about 100% by weight of the polyol of another polyhydric polyol;

(b) from about 0.2 to about 5% by weight of at least one acrylic copolymer having a number average molecular weight of from 1000 to 15000, the copolymer optionally comprising hydroxy functional group(s) and/or isocyanate functional group(s);

(c) from about 3 to about 60%, more preferably from about 4 to about 60%, even more preferably from about 5 to about 60%, by weight of at least one blocked or non-blocked isocyanate crosslinker;

where, unless stated otherwise, the above weight percentages are calculated with respect to the total weight of components (a) (b) and (c) and are selected to total 100%.

More preferably this second embodiment of the present invention provides a thermosetting powder coating composition comprising as a co-reactable binder:

(a) from about 40% to about 96% by weight of at least one hydroxy-functional polyester, with a glass transition temperature higher than 40° C., where the polyester has been obtained from the reaction of:

(i) a polyacid component comprising from about 70 to about 100% by weight of the polyacid of terephthalic acid (TPA) and/or isophthalic acid (IPA) and from 0 to about 30% by weight of the polyacid of another polyacid constituent; and (ii) a polyol comprising from 0 to about 80% by weight of the polyol of neopentyl glycol (NPG) and from about 20 to about 100% by weight of the polyol of another polyhydric polyol;

(b) from about 0.3 to about 5% by weight of at least one acrylic copolymer having a number average molecular weight of from 1000 to 15000, the copolymer optionally comprising hydroxy functional group(s) and/or isocyanate functional group(s);

(c) from about 3 to about 60%, by weight of at least one blocked or non-blocked isocyanate crosslinker;

where, unless stated otherwise, the above weight percentages are calculated with respect to the total weight of components (a) (b) and (c) and are selected to total 100%.

A still other, third, embodiment of the present invention provides radiation curable powder compositions that comprise as a binder a mixture of a polyester comprising ethylenically unsaturated groups, a small amount of an acrylic copolymer optionally comprising unsaturated functional groups; and optionally one or more oligomers having ethylenically unsaturated groups.

Preferably this third embodiment of the present invention provides a radiation curable powder coating composition comprising as a co-reactable binder:

(a) from about 70% to about 99% by weight of at least one ethylenically unsaturated groups containing polyester, with a glass transition temperature higher than 35° C., where the polyester has been obtained from the reaction of:

(i) a polyacid component comprising from about 70 to about 100% by weight of the polyacid of terephthalic acid (TPA) and/or isophthalic acid (IPA) and from 0 to about 30% by weight of the polyacid of another polyacid constituent; and (ii) a polyol comprising from 0 to about 80% by weight of the polyol of neopentyl glycol (NPG) and from about 20 to about 100% by weight of the polyol of another polyhydric polyol;

(iii) optionally a polyisocyanate (iv) a monomer having an ethylenically unsaturated double bond and a least functional group reactable with a carboxy or an isocyanate group (b) from about 0.3 to about 5% by weight of at least one acrylic copolymer having a number average molecular weight of from 1000 to 15000, the copolymer optionally comprising ethylenically unsaturated functional group(s);

(c) from about 0 to about 30% by weight of at least one ethylenically unsaturated group containing oligomer where, unless stated otherwise, the above weight percentages are calculated with respect to the total weight of components (a) (b) and (c) and are selected to total 100%.

Other suitable conventional ingredients may be added to the compositions and/or binders of the invention (for example to any of the embodiments described herein). Such ingredients may be those additional ingredients described herein or other ingredients that would be well known to those skilled in the art of formulation. For instance, flow modulators are advantageously added to the compositions of the invention.

Compositions of the invention have been found to have outstanding flow and can be used to prepare smooth coatings with good mechanical properties and without any defects upon application and curing.

Further provides is a process for making a powder composition, said method comprising the steps of (a) blending
  (A) a polyester (obtained from polyols comprising lower amounts of NPG) where the polyester comprises a first functionality,
  (B) a small amount of an acrylic copolymer optionally comprising a second functionality; and
  (C) optional an additional ingredient;
to form a binder mixture;

(b) optionally adding further ingredients to the binder mixture to form a formulation (c) homogenizing and/or grinding the formulation from step (b) to form a powder composition.

More in particular, provided is a process for making a powder composition comprising the steps of (a) blending
  (A) a polyester, where the polyester comprises a first functionality;
  (B) an acrylic copolymer, optionally comprising a second functionality; and
  (C) an optional additional ingredient;
to form a binder mixture;

(b) optionally adding further ingredients to the binder mixture to form a formulation (c) homogenizing and/or grinding the formulation from step (b) to form a powder composition.

Further provided is a method of coating an article and/or substrate with a powder composition of the invention comprising the step of:

(a) applying a powder composition of the invention to said article and/or said substrate to form a coating thereon; and (b) curing the coating thermally and/or by irradiation.

Yet another aspect concerns an article and/or substrate coated by said method. The invention further provides for an article and/or substrate coated with a composition of the invention.

Further provided is the use of an acrylic copolymer of the invention in a binder for preparing a coating composition with reduced surface defects, said binder further comprising a polyester (A) as described and possibly a further ingredient (C) which can be a cross-linker.

The invention also provides for a binder (used) for preparing a powder coating composition with reduced surface defects, said binder comprising a mixture of (A) a polyester as described, (B) an acrylic copolymer of the invention and possibly a further ingredient (C) which can be a cross-linker.

Throughout the invention, the polyester(s), acrylic copolymer(s) and further ingredient(s) may be any of those described thus far or described in sequel.

The acrylic copolymers used in the composition of the present invention must be distinguished from acrylic polymers which are added as flow promoters to conventional powder compositions. Such polymer additives are used to level the coating as they migrate to the surface. However the applicant has found that such additives do not solve the problem of susceptibility to contamination when a polyester prepared from lower amounts of NPG is used.

Definitions

As used herein unless the context dictates otherwise the following properties were measured as follows:

Molecular weight is a number averaged molecular weight (also denoted by $M_n$) in units of daltons measured by gel permeation chromatography (GPC).

Glass transition temperature (also denoted $T_g$) measured by Differential Scanning Calorimetry (DSC) according to ASTM D3418 with a heating gradient of 20° C. per minute.

Viscosity is a cone/plate viscosity measured in mPa·s by the Brookfield method at the specified temperature according to ASTM D4287-88.

AN denotes the acid number of a material measured as the amount in mg of KOH required to neutralize a gram of material.

As used herein 'radiation curable' denotes a material which will polymerize when irradiated for example with actinic radiation and/or ultraviolet (UV) light (optionally in the presence of another ingredient such as a photo initiator) and/or ionizing radiation (such as electron beam). Actinic radiation is electromagnetic radiation capable of producing photochemical action, but of insufficient energy to produce ions in a medium of common materials and usually has a wavelength of greater than 185 manometers. UV light is radiant energy having a wavelength from 180 to 400 manometers (1.8 to 4.0×10 7 meters). Ionizing radiation is particle or electromagnetic energy (such as gamma rays or X rays); capable of producing ions in common materials, usually energies of greater than about 10 electron volts or 16×10 19 joules. Electron beam (e beam) is a beam of electrons typically displaced from a metallic filament by a high voltage source of acceleration. Preferred methods to achieve radiation polymerization comprise UV light and/or e beam. The polymerization mechanism can be any suitable method that can be induced by radiation (e.g. free radical, cationic etc).

Other conventional terms from polymer science that are used herein (such as polymer, monomer, oligomer etc) shall have those meanings recommended by IUPAC, for example as defined in Pure Appl. Chem., Vol. 68, No. 12, pp. 2287-2311, 1996, the contents of which are incorporated herein by reference.

The term "comprising" as used herein will be understood to mean that the list following is non-exhaustive and may or may not include any other additional suitable items, for example one or more further feature(s), component(s), ingredient(s) and/or substituent(s) as appropriate.

Polyester

The carboxyl functional polyester that is used to prepare the first embodiment of the present invention may preferably have an acid number (AN) from about 10 to about 100 mg KOH/g, more preferably from about 15 to about 90 mg KOH/g, most preferably from about 20 to about 70 mg KOH/g.

The hydroxy functional polyester that is used to prepare the second embodiment of the present invention may preferably have an hydroxy number (OHN) from about 10 to about 450 mg KOH/g, more preferably from about 15 to about 400 mg KOH/g, most preferably from about 20 to about 350 mg KOH/g.

The polyester comprising an ethylenically unsaturated group that is used to prepare the third embodiment of the present invention may preferably have a degree of unsaturation from 0.2 to 6.0 more preferably from 0.4 to 4.0 and most preferably from 0.5 to 2.5 milliequivalents of double bonds per gram of polyester.

It is also preferred that the polyesters used in the present invention (such as the carboxy functional, hydroxy functional or ethylenically unsaturated polyesters) are amorphous. More preferably the polyesters used in the present invention may also be further characterised by one or more of the following properties:

$M_n$ from about 1100 to about 15000 daltons, more preferably from about 1600 to about 8500 daltons; $T_g$ from 40 to 80° C.; and/or viscosity, from about 5 mPas at 175° C. to about 15000 mPa·s at 200° C.

If the polyester is carboxy functional, then it is preferably present in an amount from about 40 to about 98%, more preferably from about 40 to about 96%, by weight (on the binder). If the polyester is hydroxy functional, then it is preferably present in an amount from about 40 to about 96%, more preferably from about 40 to about 95%, by weight (on the binder). If the polyester is unsaturated then it is advantageously present in an amount from about 70% to about 99% by weight (on the binder).

Preparation

Polyacid

The acid used to prepare the polyesters used in the present invention, may preferably comprise from about 70 to about 100 weight % of TPA and/or IPA and from 0 to about 30 weight % of another polyacid which may be selected from one or more: aliphatic, cycloaliphatic and/or aromatic diacids. More preferably such other polyacids may comprise: fumaric acid, maleic acid, itaconic acid, citraconic acid, mesaconic acid phthalic anhydride, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azelaic acid, sebacic acid, 1,12-dodecanedioic acid, trimellitic acid or pyromellitic acid, any of their corresponding anhydrides, and/or any mixtures thereof. Most preferably adipic acid and/or trimellitic anhydride are used to react with the polyhydric alcohols described herein to prepare the polyester component in compositions of the present invention.

Polyol

The polyol used to prepare the polyesters preferably comprises from about 0 to 85% by weight of the polyol of NPG and from 100 to 15% by weight of the polyol of another polyhydric alcohol such as a glycol which more preferably may be selected from one or more: (cyclo)aliphatic glycols such as: ethyleneglycol, diethylene glycol, 2-methyl-1,3-propanediol, propyleneglycol, 1,4-butanediol, 1,6-hexanediol, 1,4-cyclohexanediol, 1,4-cyclohexanedimethanol, hydrogenated Bisphenol A, hydroxypivalate of neopentyl glycol, glycerol, trimethylolpropane, ditrimethylolpropane, pentaërythrytol and/or mixtures thereof. Most preferably ethylene glycol, diethylene glycol, 2-methyl-1,3-propanediol, glycerol and/or trimethylolpropane are used to react with the acids described herein to prepare the polyester component in compositions of the present invention.

The polyol used to prepare the polyesters used in the present invention, may preferably comprise from about 0 to 80 weight % of NPG and from 100 to 20 weight % of another polyhydric alcohol such as a glycol which more preferably may be selected from one or more: (cyclo)aliphatic glycols such as: ethyleneglycol, diethylene glycol, 2-methyl-1,3-propanediol, propyleneglycol, 1,4-butanediol, 1,6-hexanediol, 1,4-cyclohexanediol, 1,4-cyclohexanedimethanol, hydrogenated Bisphenol A, hydroxypivalate of neopentyl glycol, glycerol, trimethylolpropane, ditrimethylolpropane, pentaërythrytol and/or mixtures thereof. Most preferably ethylene glycol, diethylene glycol, 2-methyl-1,3-propanediol, glycerol and/or trimethylolpropane are used to react with the acids described herein to prepare the polyester component in compositions of the present invention.

Advantageously the polyol comprises (from 0) up to 75%, up to 70%, more preferably up to 65%, up to 60%, possibly up to 55%, up to 50% or up to 45%, by weight, of NPG. More preferably the polyol used to prepare the polyester comprises not more than 50% by weight of NPG. Preferably the polyol comprises at least 25%, at least 30%, more preferably at least 35%, at least 40%, possibly at least 45%, at least 50%, or at least 55%, by weight, of said other polyhydric alcohol (for preferred alcohols see above and see infra).

Most preferably said other polyhydric alcohols are ethylene glycol and/or diethylene glycol; possibly in combination with propanediol, glycerol and/or trimethylolpropane.

Advantageously the polyol comprises at least 15%, at least 20%, preferably at least 25%, at least 30%, more preferably at least 40%, at least 50%, possibly at least 60%, at least 70%, at least 80% or even at least 90 weight % of ethylene glycol and/or diethylene glycol.

Unsaturated Monomer

Polyesters used in the present invention may be prepared from monomers that comprise an ethylenically unsaturated group (such as in the third embodiment (a) (iv)). Preferably such monomers may also comprise a functional group reactable with a carboxylic acid-, or an isocyanate group. More preferred monomers are selected from, glycidyl acrylate, glycidyl methacrylate, methyl glycidyl methacrylate, methyl glycidyl acrylate, 3,4-epoxycyclohexylmethyl(meth) acrylate, acrylic glycidyl ether, hydroxyethyl(meth)acrylate, 2- or 3-hydroxypropyl(meth)acrylate, 2-, 3- and 4-hydroxybutyl(meth)acrylate.

Polyisocyanates

Polyesters used in the present invention may be prepared from polyisocyanates (such as in the third embodiment (a) (iii)). Preferred polyisocyanates are selected from: 1-isocyanato-3,3,5-trimethyl-5-isocyanatomethyl-cyclohexane (isophorondiisocyanate, IPDI), tetramethylxylenediisocyanate (TMXDI), hexamethylenediisocyanate (HDI), trimethylhexamethylenediisocyanate, 4,4'-diisocyanatodicyclohexylmethane, 4,4'-diisocyanatodiphenylmethane, copolymerisation products of α,α'-dimethyl-meta-isopropenylbenzyl isocyanate (TMI), 2,4-diisocyanatotoluene, higher homologues of diisocyanates herein, and/or suitable mixtures thereof (such as technical mixtures with 2,4-diisocyanatodiphenylmethane; technical mixtures of 2,4-diisocyanatotoluene and 2,6-diisocyanatotoluene)

Esterification

The polyesters described herein can be prepared using conventional esterification techniques well known in the art and can be prepared in a single reaction or multiple reaction steps. The equipment used to prepare the polyester may also be conventional such as a reactor equipped with a stirrer, an inert gas (nitrogen) inlet, a thermocouple, a distillation column connected to a water-cooled condenser, a water separator and a vacuum connection tube. Conventional esterification conditions well known to those skilled in the art may be used such as standard esterification catalysts, e.g. dibutyltin oxide, dibutyltin dilaurate, n-butyltin trioctoate, tetra-n-butyltitanate, sulphuric acid and/or a sulphonic acid, in an amounts from 0.01 to 1.50% by weight of the reactants. However, optionally, even less or no catalyst can be used. Other optional ingredients such as colour stabilisers, phenolic antioxidants such as Irganox 1010 (Ciba) or Cyanox 1790 (Cytec) or phosphonite- and phosphite-type stabilisers such as tributylphosphite, can also be added during esterification in an amount from 0 to 1% by weight of the reactants.

Polyesterification is generally carried out at a temperature which is gradually increased from 130° C. to about 190 to 280° C., first under normal pressure, then, when necessary, under reduced pressure at the end of each process step, while maintaining these operating conditions until a polyester is obtained, which has the desired hydroxy and/or acid number. The degree of esterification is followed by determining the amount of water formed in the course of the reaction and the properties of the obtained polyester, for example the hydroxy number, the acid number, the molecular weight or the viscosity.

Cross-linking catalysts can optionally be added to the polyester while it is still in the molten state. These catalysts are added in order to accelerate cross-linking of the thermosetting powder composition during curing. When the polyester is carboxy functional (such as in the first embodiment) preferred catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride) amongst others. When the polyester is hydroxy functional (such as in the second embodiment) preferred catalysts include tin catalysts (e.g. dibutyltin dilaurate or dibutyltin maleate, and bismuth catalysts (e.g. bismuth octoate), amongst others. However any of the catalysts listed herein may optionally be used to prepare any of the embodiments described herein. These catalysts are preferably used in an amount of 0 to 5% with respect of the weight of the polyester.

When the polyester used in the present invention contains carboxy or hydroxy groups and also ethylenically unsaturated groups, then after polycondensation is complete preferably the reaction mixture is allowed to cool to a temperature from about 100° C. to about 160° C., and a radical polymerisation inhibitor may also be added (such as phenothiazine or. an inhibitor of the hydroquinone type). The inhibitor may be added in an amount from 0.01 to 1% with respect to the weight of the polyester. The above described nitrogen inlet may also be replaced by an oxygen inlet.

When a hydroxy functional polyester is used in the present invention a substantially equivalent amount of hydroxyalkyl (meth)acrylate may be added thereto. When all the hydroxyalkyl(meth)acrylate is added, an equivalent amount of diisocyanate may then be slowly added to the mixture. A catalyst for the hydroxy/isocyanate reaction can optionally be used. Examples of such catalysts include organo-tin compounds. These catalysts are preferably used in an amount of 0 to 1% with respect to the weight of the polyester.

When a carboxy functional polyester is used in the present invention a substantially equivalent amount of glycidyl (meth)acrylate may be added thereto. A catalyst for the acid/ epoxy reaction can optionally be used. Examples of such catalysts include amines, phosphines, ammonium salts, or phosphonium salts. These catalysts are preferably used in an amount of 0.05 to 1% with respect to the weight of the polyester.

The degree of progression of the reaction may be monitored by determination of the properties of the polyester obtained, for example the hydroxy number, the acid number, the degree of unsaturation and/or the content of free glycidyl (meth)acrylate or hydroxyalkyl(meth)acrylate.

Crosslinker

When the polyester resin is carboxyl functionalised, the curing agent is generally selected from polyepoxy compound or a β-hydroxyalkylamide containing compound.

Preferred crosslinkers that may be used in the present invention are glycidyl group containing polyphenoxy resins, such as Bisphenol A based epoxy resins and/or phenol or cresol epoxy novolacs.

Bisphenol A based epoxy resins are prepared from the reaction of Bisphenol A and epichlorohydrin, wherein the excess of epichlorohydrin determines the number average molecular weight of the epoxy resin. (for further information see W. G. Potter: Epoxide Resins, Springer-Verlag, New York 1970, Y. Tanaka, A. Okada, I. Tomizuka in C. A. May, Y. Tanaka (eds.): Epoxy Resins Chemistry and Technology, Marcel Dekker, New York 1973, chapter 2, pp. 9-134 which is hereby incorporated by reference).

Phenol and cresol epoxy novolacs are prepared by the acid-catalyzed condensation of formaldehyde with either phenol or cresol. Epoxidation of the novolacs with epichlorohydrin furnishes the epoxy novolacs. Commercially available epoxy resins, such as Epikote 1055 from Hexion, Araldite GT7004 or Araldite ECN9699 from Huntsman, D.E.R.664 from Dow, Epon 2002 from Hexion etc., are typical examples of glycidyl group containing polyphenoxy compounds.

Other preferred polyepoxy compounds are solid at room temperature and comprise at least two epoxy groups per molecule such as triglycidyl isocyanurate (e.g. that available commercially from Huntsman under the trade designation Araldite PT810); and/or the epoxy resin available commercially from Huntsman under the trade designation Araldite PT910.

Preferred β-hydroxyalkylamides comprise at least one, preferably two bis(β-hydroxyalkyl)amide groups. More preferred β-hydroxyalkylamides are those available commercially from EMS under the trade designations Primid XL552, Primid QM1260 and Primid SF 4510 and also those described in U.S. Pat. No. 4,727,111, U.S. Pat. No. 4,788,255, U.S. Pat. No. 4,076,917, EP 0322834 and EP 0473380.

When the polyester resin is hydroxy functionalised, the curing agent is generally selected from blocked or non-blocked isocyanate crosslinking agents, well known in the art.

Examples of the blocked polyisocyanate crosslinking compounds include those which are based on isophorone diisocyanate blocked with ε-caprolactam, commercially available as Hüls B1530, Ruco NI-2, Cargill 2400 and Additol P 932, or toluene-2,4-diisocyanate blocked with ε-caprolactam, commercially available as Cargill 2450, or diphenylmethane-diisocyanate blocked with ε-caprolactam, commercially available as Additol P 965 and phenol-blocked hexamethylene diisocyanate.

Another class of blocked polyisocyanate compounds which may be employed are adducts of the 1,3-diazetidine-2,4-dione dimer of isophorone diisocyanate and a diol, wherein the ratio of NCO to OH-groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70 to 130° C. Such adduct is commercially available under the name Hüls BF1540.

Ethylenically Functional Oligomer

Preferred ethylenically unsaturated oligomer (for examples used in the third embodiment (c)) may be selected from:

allyl ether-ester group containing oligomers, such as the ester of trimethylolpropane diallylether or pentaerythritol triallylether and a polycarboxylic acid or anhydride, for example the trimethylolpropane diallylether diester and triester of trimellitic anhydride or the pentaerythritol triallylether diester of adipic acid oligomers containing allyl-groups and urethane-groups for example those obtained from the reaction of allyl alcohol, trimethylolpropane diallylether, pentaërythritol triallylether with isophoronediisocyanate, toluenediisocyanate, hexamethylenediisocyanate, oligomers such as triallylcyanurate, triallylisocyanurate, diallylphthalate vinylether group containing oligomers such as butylvinylether, cyclohexyldimethanol divinylether, butyldivinylether, triethyleneglycoldivinylether, hydroxybutylvinylether polyurethaneoligomers having vinylether and/or allylether and/or (meth)acrylate ester end-groups and optionally a polyether, polyester or polycarbonate backbone, prepared from the reaction of respectively hydroxyalkylvinylether, hydroxyalkylallylether or hydroxyalkyl(meth)acrylate with a polyisocyanate and optionally a hydroxy functional oligomer, this oligomer being a polyether, polyester or polycarbonate triacrylate and tri methacrylate of tris(2-hydroxyethyl)isocyanurate;

suitable mixtures thereof.

Acrylic Polymer

Preferred acrylic copolymers used in the present invention may also be further characterised by one or more of the following properties: a $M_n$ from about 1000 to about 15000 daltons, more preferably from about 3000 to about 10000 daltons, and/or viscosity from about 3 mPas at room temperature to 50000 mPas at 200° C., more preferably from 100 mPas at 100° C. to 30000 mPa·s at 200° C. and most preferably from 60 mPas at 170° C. to about 10000 mPas at 200° C.

In yet one other embodiment of the invention the acrylic copolymers may have a glass transition temperature ($T_g$) from −60 to 100° C., more preferably from −40 to 80° C. and most preferably from 25 to 65° C.

In yet still other embodiment of the invention the acrylic copolymers may have a glass transition temperature ($T_g$) from −60 to 100° C., more preferably from −60 to 40° C. and most preferably from −40 to 20° C.

The acrylic copolymer may be liquid at room temperature or may be solid at room temperature.

The acrylic copolymer of the present invention may have functional group similar to- or reactable with the polyesters' functional groups.

When carboxyl functional polyesters are used, acrylic copolymers useful in the present invention optionally comprise carboxyl and/or glycidyl functional groups. If both functional groups are present the carboxy and glycidyl functional groups may be on different polymers or it is also possible that the same polymer comprises both functional groups.

These acrylic copolymers may also comprise other groups such as a hydroxy- and/or an isocyanate and/or an ethylenically unsaturated group, examples of groups that do not participate to the cross-linking reaction. Preferably such groups are selected from hydroxy- and/or ethylenically unsaturated groups. A preferred such group is a hydroxyl group.

When hydroxy functional polyesters are used, acrylic copolymers useful in the present invention optionally comprise hydroxy and/or isocyanate functional groups. If both functional groups are present the hydroxy and isocyanate functional groups may be on different polymers or it is also possible that the same polymer comprises both functional groups.

These acrylic copolymers may also comprise other groups such as a carboxy- and/or a glycidyl- and/or an ethylenically unsaturated group, examples of groups that do not participate to the cross-linking reaction.

When ethylenically unsaturated group containing polyesters are used, acrylic copolymers useful in the present invention optionally comprise ethylenically unsaturated groups.

These acrylic copolymers may also comprise groups (thereon) such as a carboxy- and/or a glycidyl- and/or a hydroxy- and/or an isocyanate group, examples of groups that do not participate to the cross-linking reaction.

Optional carboxy functional acrylic copolymer(s) have AN from about 5 to about 100 mg KOH/g, preferably from about 10 to about 100 mg KOH/g, more preferably from about 10 to about 90 mg KOH/g, most preferably from about 20 to about 90 mg KOH/g.

Convenient carboxy functional monomers that may be used to prepare a carboxy-functional acrylic copolymer used in the present invention comprise: acrylic acid, methacrylic acid, crotonic acid, itaconic acid, fumaric acid, maleic acid, citraconic acid, and the monoalkylesters of itaconic acid, fumaric acid, maleic acid, citraconic acid and/or any mixtures thereof.

Optional glycidyl functional acrylic copolymer(s) are characterised by an epoxy equivalent weight of from about 150 to about 1000 g, more preferably from about 250 to about 800 g of acrylic copolymer per equivalent of epoxy.

Convenient glycidyl functional monomers that may be used to prepare a glycidyl-functional acrylic copolymer used in the present invention comprise, glycidyl acrylate, glycidyl methacrylate, methyl glycidyl methacrylate, methyl glycidyl acrylate, 3,4-epoxycyclohexylmethyl(meth)acrylate, acrylic glycidyl ether and/or any mixtures thereof.

Optional hydroxy functional acrylic copolymer(s) may have hydroxy number (OHN) from about 5 to about 250 mg KOH/g, generally from about 10 to about 200 mg KOH/g, advantageously from about 10 to about 180 mg KOH/g.

More preferred, optional hydroxy functional acrylic copolymer(s) have hydroxy number (OHN) from about 10 to about 100 mg KOH/g, even more preferably from about 20 to about 90 mg KOH/g.

Convenient hydroxy functional monomers that may be used to prepare a hydroxy-functional acrylic copolymer used in the present invention comprise: hydroxyethyl acrylate, hydroxyethyl methacrylate, 2- and 3-hydroxypropylacrylate, 2- and 3-hydroxypropylmethacrylate, 2-, 3- and 4-hydroxybutylacrylate, 2-, 3- and 4-hydroxybutylmethacrylate, polyethyleneglycol monomethacrylate (n=5) and polyethyleneglycol monomethacrylate (n=10) and/or any mixtures thereof.

Optional isocyanate functional acrylic copolymer(s) are characterised by an isocyanate equivalent weight of from about 250 to about 1100 g, more preferably from about 350 to about 700 g of acrylic copolymer per equivalent of isocyanate.

Convenient isocyanate functional monomers that may be used to prepare a isocyanate-functional acrylic copolymer used in the present invention comprise, 2-isocyanatoethyl methacrylate, methacryloyl isocyanate, 1-(1-isocyanato-1-methylethyl)-3-(1-methylethenyl)benzene and/or any mixtures thereof.

Optional acrylic copolymers containing ethylenically unsaturated groups, have a degree of unsaturation of 0.35 to 3.5, preferably of 0.5 to 2.5, milliequivalents of double bonds per gram of acrylic copolymer and are prepared accordingly a two-step process, where in the second step an acrylic copolymer having functional group is reacted with a (meth)acryloyl group containing monomer having functional groups reactable with the functional groups of the acrylic copolymer as prepared in the first step.

So, if the acrylic copolymer, prepared in the first step, contains glycidyl groups, it may be reacted with acrylic or methacrylic acid, for example. Conversely, if the acrylic copolymer contains carboxyl groups, for example introduced by acrylic or methacrylic acid, it may be reacted with glycidyl or β-methylglycidyl acrylate or methacrylate. If the acrylic copolymer contains the isocyanato group, it may be reacted with hydroxyethyl acrylate or methacrylate, and the like.

Other copolymerisable monomers may also be used, and such monomers may be selected from:
methyl(meth)acrylate, ethyl(meth)acrylate, n-propyl(meth)acrylate, isopropyl(meth)acrylate n-butyl(meth)acrylate, isobutyl(meth)acrylate, tert.-butyl(meth)acrylate, n-hexyl(meth)acrylate, n-amyl(meth)acrylate, isoamyl(meth)acrylate, allyl(meth)acrylate, 2-ethylbutyl(meth)acrylate, 2-ethylhexyl(meth)acrylate, stearyl(meth)acrylate, tridecyl(meth)acrylate, cyclohexyl(meth)acrylate, n-hexyl(meth)acrylate, benzyl(meth)acrylate, phenyl(meth)acrylate, isobornyl(meth)acrylate, dihydrodicyclopentadienyl(meth)acrylate, 2-ethylhexyl(meth)acrylate, lauryl(meth)acrylate, stearyl(meth)acrylate, isodecyl(meth)acrylate, tridecyl(meth)acrylate, nonyl(meth)acrylate, cinnamyl(meth)acrylate, crotyl(meth)acrylate, cyclohexyl(meth)acrylate, cyclopentyl(meth)acrylate, methallyl(meth)acrylate, n-octyl(meth)acrylate, 2-phenylethyl(meth)acrylate, phenyl(meth)acrylate, 1,4-butandiol mono(meth)acrylate, the esters of (meth)acrylic acid, crotonic, the diesters of maleic acid, maleic anhydride, fumaric acid, itaconic acid, and citraconic acid dimethylaminoethyl(meth)acrylate, diethylaminoethyl(meth)acrylate, styrene, α-methylstyrene, vinyltoluene, (meth)acrylonitrile, vinylacetate, vinylpropionate, acrylamide, methacrylamide, methylol(meth)acrylamide, vinylchloride, vinylidene fluoride ethylene, propylene, alkyl-substituted styrenes, chloro-substituted styrenes, $C_{4-20}$ olefins, α-olefins and/or any mixtures thereof.

When the acrylic copolymers comprise carboxy, glycidyl and/or (meth)acryloyl functional groups the other copolymerisable monomers can also be selected from hydroxyethyl acrylate, hydroxyethyl methacrylate, 2- and 3-hydroxypropylacrylate, 2- and 3-hydroxypropylmethacrylate, 2-, 3- and 4-hydroxybutylacrylate, 2-, 3- and 4-hydroxybutylmethacrylate, polyethyleneglycol monomethacrylate (n=5), polyethyleneglycol monomethacrylate (n=10), 2-isocyanatoethyl methacrylate, methacryloyl isocyanate, 1-(1-isocyanato-1-methylethyl)-3-(1-methylethenyl)benzene and/or any mixtures thereof.

When the acrylic copolymers comprise hydroxy, isocyanate and/or (meth)acryloyl functional groups the other copolymerisable monomers can also be selected from acrylic acid, methacrylic acid, crotonic acid, itaconic acid, fumaric acid, maleic acid, citraconic acid, and the monoalkylesters of itaconic acid, fumaric acid, maleic acid, citraconic acid, glycidyl acrylate, glycidyl methacrylate, methyl glycidyl methacrylate, methyl glycidyl acrylate, 3,4-epoxycyclohexylmethyl(meth)acrylate, acrylic glycidyl ether and/or mixtures thereof.

The acrylic copolymer of the present invention advantageously is composed of (or is obtained from) (A) from 30 to 100 mole % of (an optionally halogenated) methyl(meth)acrylate and/or (an optionally halogenated) ethyl(meth)acrylate and/or an ethylenically unsaturated monomer different from a (meth)acryloyl group containing monomer; (B) from 0 to 60 mole % of one or more (cyclo)alkyl(meth)acrylate monomers characterized in that the (cyclo)alkyl group comprises from 3 to 20 carbon atoms, said (cyclo)alkyl groups preferably selected from propyl, n-butyl, isobutyl, tert-butyl, n-hexyl, 2-ethylhexyl, lauryl, stearyl, tridecyl, cyclohexyl, isobornyl, or dihydrodicyclopentadienyl; and (C) from 0 to 45 mole % of a monomer having an ethylenically unsaturated double bond and a functional group selected from the carboxyl, glycidyl, hydroxy and/or isocyanate group.

An example of a halogenated ethyl(meth)acrylate is trifluoro-ethyl-methacrylate (MATRIFE).

Advantageously the amount of ethyl(meth)acrylate, more preferably ethylacrylate, is less than 60 mole %, preferably less than 40 mole %, more preferably less than 20 mole %, most preferably less than 10 mole %, or even less than 5 mole %. Possibly the acrylic copolymer is not comprising any ethyl(meth)acrylate, more in particular ethylacrylate.

Advantageously the acrylic copolymer comprises as compound (A) from 30 to 100 mole % of said methyl(meth)acrylate and/or said ethylenically unsaturated monomer different from a (meth)acryloyl group containing monomer.

The amount of said methyl(meth)acrylate and/or said ethyl(meth)acrylate (where present) and/or said ethylenically unsaturated monomer different from a (meth)acryloyl group containing monomer is preferably at least 40 mole %, at least 50 mole %, more preferably at least 60 mole %, at least 70 mole %, at least 80 mole %, at least 85 mole %.

Preferably the amount of these compounds is maximally 99 mole %, maximally 98 mole %, more preferably maximally 97 mole %, most preferably maximally 96 mole %. Herein any of the lower limits can be combined with any of the upper limits.

Preferred ranges are from 30 to 98 mole %, from 30 to 95 mole %, more preferably from 60 to 95 mole %.

Examples of ethylenically unsaturated monomers different from a (meth)acryloyl group containing monomer suitable for the purposes of the invention are styrenes (such as styrene and/or alpha-methyl-styrene) and/or diisopropylmaleate.

Preferably the acrylic copolymer of the invention comprises at least one of methyl(meth)acrylate, styrene, alpha-methyl-styrene and/or MATRIFE. More preferably the acrylic copolymer comprises at least one of methyl(meth)acrylate, alpha-methyl-styrene and/or styrene; possibly in combination with MATRIFE and/or diisopropylmaleate.

Advantageously the amount of one or more (cyclo)alkyl(meth)acrylate monomers with the (cyclo)alkyl group comprising from 3 to 20 carbon atoms is from 0 to 60 mole %, preferably from 0 to 50 mole %, more preferably from 0 to 40 mole %.

Preferably the amount of such (cyclo)alkyl(meth)acrylate monomers is at least 5 mole %. Herein any of the upper limits can be combined with any of the lower limits.

Advantageously the acrylic copolymer of the invention comprises from 0 to 45 mole % of a monomer having an ethylenically unsaturated double bond and a functional group selected from the carboxyl, glycidyl, hydroxy and/or isocyanate group. Advantageously said amount is maximally 40 mole %, preferably maximally 35 mole %, more preferably maximally 30 mole %. If the acrylic copolymer of the invention is functional (more in particular comprises said second functionality), then this amount preferably is at least 2 mole %, more preferably is at least 5 mole %. If the acrylic copolymer is non-functional then this amount is 0 mole %. Herein any of the lower limits may be combined with any of the upper limits.

Advantageously, the acrylic copolymer of the present invention preferably is composed of (A) from 30 to 95 mole % methyl(meth)acrylate and/or ethyl(meth)acrylate and/or an ethylenically unsaturated monomer different from a (meth)acryloyl group containing monomer, (B) from 5 to 60 mole % of one or more (cyclo)alkyl(meth)acrylate monomers characterized in that the (cyclo)alkyl group comprises from 3 to 20 carbon atoms, said (cyclo)alkyl group preferably selected from propyl, n-butyl, isobutyl, tert-butyl, n-hexyl, 2-ethylhexyl, lauryl, stearyl, tridecyl, cyclohexyl, isobornyl, or dihydrodicyclopentadienyl and (C) from 0 to 45 mole % of a monomer having an ethylenically unsaturated double bond and a functional group selected from the carboxyl, glycidyl, hydroxy and/or isocyanate group.

The acrylic copolymer of the present invention preferably is composed of (or is obtained from) (A) from 60 to 95 mole % methyl(meth)acrylate and/or ethyl(meth)acrylate and/or an ethylenically unsaturated monomer different from a (meth)acryloyl group containing monomer; (B) from 0 to 50 mole %, more preferably from 5 to 50 mole % of one or more (cyclo)alkyl(meth)acrylate monomers characterized in that the (cyclo)alkyl group comprises from 3 to 20 carbon atoms, said (cyclo)alkyl group preferably selected from propyl, n-butyl, isobutyl, tert-butyl, n-hexyl, 2-ethylhexyl, lauryl, stearyl, tridecyl, cyclohexyl, isobornyl, or dihydrodicyclopentadienyl; and (C) from 0 to 45 mole %, more preferably 0 to 30 mole % of a monomer having an ethylenically unsaturated double bond and a functional group selected from the carboxyl, glycidyl, hydroxy and/or isocyanate group.

Advantageously the amount (sum) of elements (A), (B) and (C) of the acrylic copolymer does not exceed 100 mole % and preferably equals 100 mole %.

For the preferred functional groups according to the functionality of the polyester(s) see infra.

The acrylic copolymer (in any embodiment of the invention) may or may not comprise the second functionality as defined. (In addition to, but preferably instead of, said second functionality) the acrylic copolymer may comprise other groups (e.g. may comprise a hydroxyl group when the polyester is carboxyl functional). Advantageously the acrylic copolymer comprises no functionality, no functional groups.

Acrylic Polymerisation

The acrylic copolymers may be prepared by any conventional polymerisation techniques, either in mass, in emulsion, or in solution in an organic solvent. Suitable solvents include toluene, ethyl acetate, butyl acetate, and/or xylene. The monomers may be copolymerised in the presence of a free radical polymerisation initiator (benzoyl peroxide, dibutyl peroxide, azo-bis-isobutyronitrile, and the like) in an amount representing 0.1 to 4.0% by weight of the monomers.

To achieve a good control of the molecular weight and its distribution, a chain transfer agent, preferably of the mercaptan type, such as n-dodecylmercaptan, t-dodecanethiol, iso-octylmercaptan, or of the carbon halide type, such as carbon tetrabromide, bromotrichloromethane, etc., can be added in the course of the reaction. The chain transfer agent may be used in amounts of up to 10% by weight of the monomers used in the copolymerisation.

Polymerisation may be carried out under conventional conditions and equipment. A cylindrical, double walled reactor equipped with a stirrer, a condenser, an inert gas (nitrogen, for example) inlet and outlet, and metering pump feed systems is generally used to prepare the acrylic copolymer. Thus, when polymerisation is carried out in solution, for example, an organic solvent is introduced into the reactor and heated to reflux temperature under an inert gas atmosphere (nitrogen, carbon dioxide, and the like) and a homogeneous mixture of the required monomers, free radical polymerisation initiator and chain transfer agent, when needed, can then be added to the solvent gradually over several hours. The reaction mixture can be maintained at the indicated temperature for some hours, while stirring. When needed, the copolymer obtained can be subsequently freed from the solvent in vacuo.

Optionally a second step may be used where the functionalised acrylic copolymer is reacted with a second monomer comprising both an ethylenically unsaturated group, and also a functional group capable of reacting with the functional group of the acrylic copolymer. This second step is needed to prepare acrylic copolymers that comprises (meth)acryloyl) groups (where the second monomer comprises acryloyl or methacryloyl groups).

The second step reaction may be carried out either in bulk or in a solvent as described above in the first step. The monomer is slowly added to the reaction mixture containing the acrylic copolymer carrying functional groups, the radical polymerization inhibitor in the proportion of 0.01 to 1% by weight of the reactants and, optionally, a catalyst in the proportion of 0.01 to 1% by weight of the reactants, at a temperature of between 50 and 180° C. The reaction mixture is stirred continuously for several hours. The reaction's progression is monitored by titration. When the second reaction step has completed, the ethylenically functional acrylic copolymer is separated from the solvent in vacuo, preferably using a thin film evaporator.

Powder Composition

In addition to the components described above, other conventional ingredients can be added to compositions of the present invention such as: flow control agents (e.g. Resiflow PV5 (Worlee), Modaflow and Additol (Cytec Surface Specialities), Acronal 4F (BASF)), dispersant such as Solplus L300 and L400 (Lubrizol), degassing agents such as benzoin (BASF); tribo additives (such as Additol P 950 (Cytec Surface Specialities)), UV-light absorbers (such as Tinuvin 900 (Ciba), hindered amine light stabilisers e.g. Tinuvin 144 (Ciba) or Cyasorb UV3853 (Cytec)), antioxidants (such as Irganox 1010 (Ciba)) other stabilising agents (such as Tinuvin 312 and 1130 (Ciba) and/or phosphonite or phosphite stablisers). Advantageously the powder coating composition of the invention comprises at least one flow control agent (any of those named above or known in the art). Both, pigmented systems as well as clear lacquers can be prepared and a variety of dyes and pigments can used to prepare the composition of this invention. Examples of useful pigments and dyes are: metallic oxides (such as titanium dioxide, iron oxide, zinc oxide), metal hydroxides, metal powders, sulphides, sulphates, carbonates, silicates such as ammoniumsilicate, carbon black, talc, china clay, barytes, iron blues, lead blues, organic reds, and/or organic maroons.

The components of the composition according to the invention may be mixed by dry blending in a mixer or blender (e.g. drum mixer). The premix may then be homogenised at temperatures ranging from 70 to 150° C. in a single screw extruder such as the BUSS-Ko-Kneter or a double screw extruder such as the PRISM or APV. The extrudate, when cooled down, can be ground to a powder with a particle size ranging from 10 to 150 μm. The powdered composition may be deposed on the substrate by use of a powder gun such as an electrostatic CORONA gun or TRIBO gun. Alternative well known methods of powder deposition such as the fluidised bed technique can also be used. After deposition the powder may be heated to a temperature between 120 and 250° C., causing the particles to flow and fuse together to form coating on the substrate surface that is free from defects.

Many other variations embodiments of the invention will be apparent to those skilled in the art and such variations are contemplated within the broad scope of the present invention. Further embodiments, aspects of the invention and preferred features thereof are given in the claims herein. It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

Other conventional terminology and ingredients used in powder compositions are well known to those skilled in the art for example in "Powder Coatings—Chemistry and technology, T. A. Misev, 1991 J. Wiley & Sons Ltd", the contents of which are incorporated here by reference especially passages 42 to 82, 131 to 162 and 224 to 284.

EXAMPLES

The present invention will now be described in detail with reference to the following non limiting examples which are by way of illustration only.

Example 1

Polyester 14.55 parts of diethylene glycol, 18.07 parts of ethylene glycol and 1.53 parts of pentaerythritol are placed in a conventional four neck round bottom flask equipped with a stirrer, a distillation column connected to a water cooled condenser, an inlet for nitrogen and a thermometer attached to a thermoregulator. The flask contents are heated, while stirring under nitrogen, to a temperature of about 140° C. at which point 70.13 parts of terephthalic acid and 0.10 parts of monobutylstannoic acid are added. The reaction is continued at 240° C. under atmospheric pressure until about 95% of the theoretical amount of water is distilled and a transparent hydroxy functionalised prepolymer is obtained. This prepolymer is held at 200° C., whilst in a next step 10.81 parts of isophthalic acid are added and then the mixture is gradually heated to 230° C. After a 2 hour period at 230° C. and when the reaction mixture is transparent, 0.09 parts of tributylphosphite is added and the pressure of the reaction vessel is gradually reduced to 50 mm Hg. After 3 hours at 230° C. and a pressure of 50 mm Hg, a product is obtained with AN=50 mg KOH/g, viscosity=4500 mPa·s at 200° C. The polyester is left to stand at 180° C., and 0.98 parts of dimethyl laurylamine are added. After half an hour of stirring the contents of the reactor are discharged.

Examples 2 & 3

Polyester

Examples 2 and 3 were prepared analogously to Example 1 using the ingredients listed in Table 1. Characteristics of the resultant polyesters are also given in Table 1.

TABLE 1

| Raw material | Example 2 | Example 3 |
|---|---|---|
| Neopentyl glycol | 19.77 | 25.53 |
| Ethylene glycol | 1.91 | 7.92 |
| Diethylene glycol | | |
| 2-Methyl 1,3-propanediol | 16.76 | 8.22 |
| Trimethylolpropane | 1.45 | |
| Terephthalic acid | 65.32 | 67.48 |
| Monobutylstannoic acid | 0.07 | 0.07 |
| Isophthalic acid | 8.96 | 6.75 |
| Adipic acid | 0.12 | 2.05 |
| Tributylphosphite | 0.13 | 0.09 |
| Dimethyl laurylamine | 0.93 | |
| Ethyl-triphenyl phosphonium bromide | | 0.05 |
| Acid number (mg KOH/g) | 33 | 30 |
| Brookfield visc. @ 200° C. | 5500 | 5500 |

Example 4

Acrylic Copolymer

Diisopropyl maleate (17.62 parts) are added to a double walled flask of 5 l equipped with a stirrer, a water cooled condenser, an inlet for nitrogen and a thermocouple attached to a thermoregulator. The flask content is then heated and stirred continuously while nitrogen is purged through the diisopropyl maleate. At a temperature of 170° C. a mixture of 1.1 parts of di tert-butylperoxide, 48.75 parts of styrene, 23.35 parts of butyl acrylate, and 9.83 parts of acrylic acid is added in 5 hours with a peristaltic pump. The reaction is continued at 170° C. until a carboxyl group containing acrylic copolymer with following characteristics is obtained: AN (mg KOH/g)=76; viscosity=7500 mPa·s at 170° C.; $M_n$=3400; weight averaged molecular weight ($M_w$)=12800; $T_g$=55° C.

Example 5

Acrylic Copolymer

Diisopropylmaleate (44 parts) is added to a double walled flask as in Example 4. The flask content is then heated and stirred continuously while nitrogen is purged through the solvent. At a temperature of 170° C. a mixture of 1.10 parts of di tert-butylperoxide, 109 parts of styrene, 25 parts of isobornyl-acrylate and 71.00 parts of glycidyl methacrylate is fed in the flask with a peristaltic pump in about 6 hours. When the addition is completed, the reaction is continued at 170° C. for another 2 hours. Then a slight vacuum is applied for 10 minutes to remove unreacted monomers and later the resin is discharged and following characteristics are obtained:

| | |
|---|---|
| Brfld$^{170° C.}$ (cone/plate) | 5090 mPa · s |
| Mn | 2500 |
| Mw | 7500 |
| Epoxy Equivalent Weight | 515 g/equiv |
| $T_g$ (DSC, 20° C./min) | 50° C. |

Example 6 to 10

Powder Compositions

The resins prepared above, are then formulated into a white powder (of the formulation given in Table 2 below) by first dry blending the different components and then homogenising the melt using a PRISM 16 mm L/D 15/1 twin screw extruder at an extrusion temperature of 85° C. The homogenised mixture is then cooled and ground in an Alpine grinder. The powder is then sieved and the fraction with a particle size between 10 and 110 μm is selected for coating and testing.

TABLE 2

| Ingredient | Relative amount by weight |
|---|---|
| Binder | 590 |
| Modaflow P6000 | 10 |
| Benzoin: | 4 |
| BaSO$_4$: | 200 |
| TiO$_2$ | 200 |

The binder in the formulation comprises one of the polyesters of Example 1 to 3, one of the acrylic copolymers of Example 4 and 5 and a hardener having functional groups that react with carboxy functional polyester and acrylic copolymers (the details are given in Table 3 below).

Test Results

The powders thus obtained are deposited on cold rolled steel (0.8 mm thick) by electrostatic deposition using the GEMA—Volstatic PCG 1 spray gun. Once the coating film thickness reaches about 80 μm the panels are transferred to an air-ventilated oven, where curing proceeds for 15 minutes at a temperature of 180° C.

The paint characteristics for the finished coatings are given in Table 3 below where.

Column 1 Identification number of the formulation
Column 2 Type and quantity of amorphous polyester
Column 3 Type and quantity of acrylic copolymer
Column 4 Type and quantity of the hardener where:
  PT810=Araldite 810 (Huntsman)=triglycidylisocyanurate
  EP3003=Epikote 3003 (Hexion) Bisphenol A-type epoxy resin
  XL552=Primid XL552 (EMS)=N,N,N',N'-tetrakis-(2-hydroxyethyl)-adipamide
Column 5: Visual evaluation where 10 stands for very smooth high gloss coating and 0 stands for strong orange peel coating with a reduced gloss 60° value
Column 6: Degree of coating defects such as pinholes and craters where:
  M0 means no defects and M5 means many defects and G0 means the defects are small whereas G5 means the defects are large
Column 7: Degree of coating defects as in column 8, but after the powder of the present invention was contaminated with 0.1% of a TGIC-powder based on Crylcoat 2425-0 (Cytec).

TABLE 3

| Col 1 ID N° | Col 2 Polyester N° | Col 3 Acrylic N° | Col 4 Hardener | Col 5 Visual | Col 6 Defects | Col 7 Contamination Defects |
|---|---|---|---|---|---|---|
| Ex 6 | Ex1: 355.7 | Ex 5: 7.2 | EP3003: 237.1 | 6 | M0 | M0 |
| Ex 7 | Ex1: 353.5 | Ex 4: 10.8 | EP3003: 235.7 | 5 | M0 | M0 |

TABLE 3-continued

| Col 1 ID N° | Col 2 Polyester N° | Col 3 Acrylic N° | Col 4 Hardener | Col 5 Visual | Col 6 Defects | Col 7 Contamination Defects |
|---|---|---|---|---|---|---|
| Ex 8 | Ex2: 413.7 | Ex 5: 9.0 | EP3003: 177.3 | 4 | M0 | M1 G0 |
| Ex 9 | Ex3: 551.9 | Ex 5: 6.6 | PT810: 41.5 | 6 | M0 | M0 |
| Ex10 | Ex3: 563.7 | Ex 5: 6.6 | XL552: 29.7 | 3 | M0 | M0 |

The coatings of Example 6 to 10 all show outstanding flexibility (DI/RI = 200/200 kg · cm according to ASTM D2794) after curing for 15 minutes at 180° C.

Comparative Examples 1 to 4

By way of comparison, the polyester resins of Example 1 to 3 prepared above are formulated in a white powder described in table 4 below in the same method as described above. Coatings are prepared and tested also as described previously.

TABLE 4

| Ingredient | Relative amounts by weight |
|---|---|
| Binder | 590 |
| Modaflow P6000 | 10 |
| Benzoin: | 4 |
| BaSO$_4$ | 200 |
| TiO$_2$ | 200 |

The binder of these comparative examples contains the hardener and polyesters but no acrylic copolymer. Further details are given in Table 5 below.

TABLE 5

| Col 1 ID N° | Col 2 Polyester N° | Col 4 Hardener | Col 5 Visual | Col 6 Defects |
|---|---|---|---|---|
| Comp Ex 1 | Ex1: 354 | EP3003: 236 | 6 | M4-G2 |
| Comp Ex 2 | Ex2: 413 | EP3003: 177 | 4 | M4-G2 |
| Comp Ex 3 | Ex3: 548.7 | PT810: 41.3 | 7 | M4-G4 |
| Comp Ex 4 | Ex3: 560.5 | XL552: 29.5 | 4 | M4-G4 |

Comparison of Results

Table 5 shows that cured powder coatings obtained from a binder comprising a carboxyl functional amorphous polyester prepared from polyols with from 0% up to 72% by weight of NPG still contain many surface defects (such as craters, fish-eyes and pinholes) even using a cross-linker. This is what might be expected from the prior art.

However the results in Table 3 show that very surprisingly a nice smooth coating without any defects is obtained from powders of the invention using an identical binder system to that of Table 5 to which small amounts of an acrylic copolymer is added. These results also show that powders of the present invention are not sensitive at all to pollution with conventional powder coating formulations.

Example 11

Hydroxyl-Functional Polyester

A mixture of 229.35 parts of ethylene glycol, 118.15 parts of diethylene glycol and 22.11 parts of trimethylolpropane is placed in a conventional four neck round bottom flask equipped with a stirrer, a distillation column connected to a water cooled condenser, an inlet for nitrogen and a thermometer attached to a thermoregulator.

At a temperature of 130° C., 672.43 parts of terephthalic acid, 123.34 parts of isophthalic acid and 0.80 parts of butyl stannoic are added. The reaction is continued at 220° C. under atmospheric pressure until about 95% of the theoretical amount of water is distilled and a transparent polyester is obtained. Then a vacuum of 50 mm Hg is gradually applied. After 3 hours at 230° C. and 50 mm Hg, following characteristics are obtained:

| AN | 3.5 mg KOH/g |
|---|---|
| OHN | 27 mg KOH/g |
| BrkFld$^{200° C.}$ (cone/plate) | 10300 mPa · s |

To the polyester, thus obtained, 6.00 parts of dibutyl tindilaurate is added at 200° C.

Example 12

Unsaturated Polyester

A mixture of 239.34 parts of neopentyl glycol, 92.10 parts of ethylene glycol, 36.82 parts of diethylene glycol and 10.43 parts of trimethylolpropane is placed in a conventional four neck round bottom flask equipped with a stirrer, a distillation column connected to a water cooled condenser, an inlet for nitrogen and a thermometer attached to a thermoregulator.

At a temperature of 130° C. 640.03 parts of terephthalic acid and 0.70 parts of butyl stannoic acid are added. The reaction is continued at 220° C. under atmospheric pressure until about 95% of the theoretical amount of water is distilled and a transparent hydroxyl functionalised prepolymer with following characteristics is obtained:

| AN | 6 mg KOH/g |
|---|---|
| OHN | 55 mg KOH/g |

To the first step prepolymer standing at 210° C., 79.74 parts of fumaric acid are added. After a 2 hour period at 210° C. a vacuum of 50 mm Hg is gradually applied until following characteristics are obtained:

| AN | 35.5 mg KOH/g |
|---|---|
| OHN | 3 mg KOH/g |
| BrkFld$^{175° C.}$ (cone/plate) | 3790 mPa · s |

Subsequently the carboxyl functionalised polyester is cooled down to 150° C., 0.58 parts of di-t-butylhydroquinone along with 4.73 parts of ethyltriphenylphosphonium bromide are added along with a slow alimentation of 47.97 parts of glycidylmethacrylate. The mixture is stirred for 1 hour at 150° C. under oxygen until following characteristics are obtained:

| | |
|---|---|
| AN | 14.3 mg KOH/g |
| OHN | 23 mg KOH/g |
| BrkFld$^{200° C.}$ | 3300 mPa·s |
| Tg$^{quenched}$ (DSC, 20°/min) | 47° C. |

Example 13

Non Functional Acrylic Copolymer 392.16 weight parts of n-butylacetate are brought in a double walled flask under mild nitrogen overflow conditions as in Example 4.

The flask content is then heated and stirred continuously while nitrogen is purged through the solvent. At a temperature of 125° C., 9.80 parts of tert-butylperoxybenzoate solubilised in another 98.04 parts of n-butylacetate is fed to the reactor in 215 minutes with a peristaltic pump.

5 minutes after the start of the initiator addition, 98.04 parts styrene, 95.49 parts butylacrylate, 140.10 parts n-butylmethacrylate, 156.57 parts of methyl methacrylate and 9.80 parts of n-dodecylmercaptan is fed in the flask with a peristaltic pump in about 180 minutes. When the addition is completed, the reaction is continued at 125° C. for another 100 minutes. Then, the reaction mixture is heated for stripping at 175° C. and a reduced pressure of 600 mbar during 30 minutes in a rotary evaporator. After these 30 minutes, the temperature is kept at 175° C. but the pressure is reduced to 50 mbar for another 90 minutes until an acrylic copolymer with following characteristics is obtained:

| | |
|---|---|
| Brfld$^{200° C.}$ (cone/plate) | 8300 mPa·s |
| Mn | 7560 |
| Mw | 19202 |
| Tg (DSC, 20° C./min) | 51° C. |

Examples 14 to 15

Powder Composition

The hydroxyl functional polyester of Example 11 and the unsaturated polyester of Example 12 then are formulated into a powder according to the formulations given below (Table 6). Amounts: Relative amounts by weight.

TABLE 6

| | Example 14 | Example 15 |
|---|---|---|
| Polyester | Ex11: 308 | Ex12: 750 |
| Acrylic | Ex13: 6.16 | Ex13: 7.50 |
| Hardener | B1530*: 42.00 | |
| Irgacure 2959 | | 5.00 |
| Irgacure 819 | | 20.00 |
| Kronos 2160 | 150.00 | 250.00 |
| Benzoin | 1.75 | |
| Flow control agent | 5.00** | 5.00*** |

*B1530: blocked isophorone diisocyanate (Vestagon)
**Modaflow
***Modaflow P6000

Test Results

Coatings are prepared and tested as previously described. After a curing schedule of 18 minutes at 200° C. (for the hydroxyl functional polyester) and after melting 3 min at 140° C. (Medium Infrared and Convection) and irradiating (H+V bulb 160 W each) at 3 m/min (for the unsaturated polyester), good flexibility of respectively DI/RI=200/200 kg·cm (Example 14) and DI/RI=100/80 kg·cm (Example 15) with good MEK-resistance (>200 MEK-rubs for both) were obtained. Similar characteristics were obtained for the comparative examples when subjected to the same curing schedule. The binder of these comparative examples contains the hardener and polyesters but no acrylic copolymer.

Once more a nice smooth coating without any defects is obtained from powders of the invention but not from powders according to the comparative examples.

Example 16

Non Functional Acrylic Copolymer 395.06 weight parts of n-butylacetate are brought in a double walled flask under mild nitrogen overflow conditions as in Example 4.

The flask content is then heated and stirred continuously while nitrogen is purged through the solvent. At a temperature of 125° C., 12.35 parts of tert-butylperoxybenzoate solubilised in another 98.77 parts of n-butylacetate is fed to the reactor in 215 minutes with a peristaltic pump.

5 minutes after the start of the initiator addition, 87.15 parts styrene, 65.66 parts n-butylmethacrylate, 341.02 parts of methyl methacrylate is fed in the flask with a peristaltic pump in about 180 minutes. When the addition is completed, the reaction is continued at 125° C. for another 100 minutes. Then, the reaction mixture is heated for stripping at 175° C. and a reduced pressure of 600 mbar during 30 minutes in a rotary evaporator. After these 30 minutes, the temperature is kept at 175° C. but the pressure is reduced to 50 mbar for another 90 minutes until an acrylic copolymer with following characteristics is obtained:

| | |
|---|---|
| Brfld$^{200° C.}$ (cone/plate) | 6800 mPa·s |
| Mn | 7690 |
| Mw | 21530 |
| Tg (DSC, 20° C./min) | 87° C. |

Example 17

Non Functional Acrylic Acrylic Copolymer

Diisopropyl maleate (10.6 parts) are added to a double walled flask of 5 l equipped with a stirrer, a water cooled condenser, an inlet for nitrogen and a thermocouple attached to a thermoregulator. The flask content is then heated and stirred continuously while nitrogen is purged through the diisopropyl maleate. At a temperature of 170° C. a mixture of 0.5 parts of di tert-butylperoxide, 12.7 parts of styrene, 5.9 parts of butyl acrylate, and 70.8 parts of methylmethacrylate is added in 8 hours with a peristaltic pump. The reaction is continued at 170° C. until an acrylic copolymer with following characteristics is obtained: viscosity=4500 mPa·s at 170° C.; Tg=40° C.

Example 18

Non Functional Acrylic Acrylic Copolymer

Diisopropyl maleate (10.6 parts) are added to a double walled flask of 5 l equipped with a stirrer, a water cooled condenser, an inlet for nitrogen and a thermocouple attached to a thermoregulator. The flask content is then heated and stirred continuously while nitrogen is purged through the diisopropyl maleate. At a temperature of 170° C. a mixture of 0.5 parts of di tert-butylperoxide, 13.5 parts of butyl acrylate, and 75.8 parts of methylmethacrylate is added in 5 hours with a peristaltic pump. The reaction is continued at 170° C. until an acrylic copolymer with following characteristics is obtained: viscosity=12000 mPa·s at 170° C.; Tg=37° C.

The acrylic copolymers of Examples 16 to 18 were formulated into a powder as illustrated for examples 6 and 7 above, with the same or another carboxy-functional polyester prepared from lower amounts of NPG. Coatings obtained therewith were nice and smooth.

The invention claimed is:

1. A mixture consisting of:
(a) from 40% to 96% by weight of at least one carboxyl-functional polyester with a glass transition temperature higher than 40° C.,
  wherein the at least one polyester has been obtained from the reaction of:
    (i) a polyacid component comprising from 70 to 100% by weight of terephthalic acid (TPA) and/or isophthalic acid (IPA) and from 0 to 30% by weight of another polyacid constituent; and
    (ii) a polyol comprising from greater than 0 to 80% by weight of neopentyl glycol and from 20 to less than 100% by weight of another polyhydric polyol;
(b) from 0.3 to 5% by weight of at least one acrylic copolymer having a number average molecular weight of from 1000 to 15000,
  wherein the at least one acrylic copolymer optionally comprises carboxy functional group(s) and/or glycidyl functional group(s), and
  wherein the at least one acrylic copolymer is obtained from
    (A) from 60 to 100 mole % of methyl (meth)acrylate ethyl (meth)acrylate and/or an ethylenically unsaturated monomer different from a (meth)acryloyl group containing monomer;
    (B) from 0 to 60 mole % of one or more (cyclo)alkyl (meth)acrylate monomers characterized in that the (cyclo)alkyl group comprises from 3 to 20 carbon atoms, and
    (C) from 0 to 45 mole % of a monomer having an ethylenically unsaturated double bond and a functional group selected from a carboxyl or glycidyl group; and
(c) from 3 to 60% by weight of at least one glycidyl functional polyphenoxy resin, a polyepoxy and/or β-hydroxyalkylamide crosslinker;
wherein, unless stated otherwise, the above weight percentages are calculated with respect to the total weight of components (a), (b) and (c) and are selected to total 100%.

2. The mixture according to claim 1, wherein the (cyclo) alkyl group that comprises from 3 to 20 carbon atoms is selected from the group consisting of propyl, n-butyl, isobutyl, tert-butyl, n-hexyl, 2-ethylhexyl, lauryl, stearyl, tridecyl, cyclohexyl, isobornyl, and dihydrodicyclopentadienyl.

3. The mixture according to claim 1, wherein the at least one acrylic copolymer is composed of
(A) from 60 to 95 mole % methyl (meth)acrylate ethyl (meth)acrylate and/or an ethylenically unsaturated monomer different from a (meth)acryloyl group containing monomer;
(B) from 5 to 60 mole % of one or more (cyclo)alkyl(meth) acrylate monomers characterized in that the (cyclo)alkyl group comprising from 3 to 20 carbon atoms is selected from the group consisting of propyl, n-butyl, isobutyl, tert-butyl, n-hexyl, 2-ethylhexyl, lauryl, stearyl, tridecyl, cyclohexyl, isobornyl, and dihydrodicyclopentadienyl, and
(C) from 0 to 45 mole % of a monomer having an ethylenically unsaturated double bond and a functional group selected from a carboxyl or glycidyl group.

4. The mixture according to claim 1, wherein the another polyhydric polyol is selected from the group consisting of ethylene glycol, diethylene glycol, 2-methyl-1,3-propanediol, glycerol, trimethylolpropane, and mixtures thereof.

5. The mixture according to claim 1, wherein the polyol comprises not more than 50 weight % of neopentyl glycol.

6. The mixture according to claim 1, wherein the at least one polyester is amorphous.

7. The mixture according to claim 1, wherein the at least one acrylic copolymer comprises the carboxy functional group(s) and/or the glycidyl functional group(s).

8. The mixture according to claim 1, wherein the at least one acrylic copolymer does not comprise the carboxy functional group(s) and/or the glycidyl functional group(s).

9. The mixture according to claim 1, wherein the at least one polyester comprises carboxy functional groups and the at least one acrylic copolymer comprises hydroxyl groups and/or ethylenically unsaturated groups.

10. The mixture according to claim 1, wherein the at least one acrylic copolymer has a glass transition temperature of from 25 to 100° C.

* * * * *